United States Patent Office 3,109,745
Patented Nov. 5, 1963

3,109,745
CERIUM MONOSULFIDE ARTICLES, METHOD OF MAKING SAME, AND COMPOSITION THEREFOR
Stephen P. Begany, Lakewood, Joseph C. Fisher, Jr., Fostoria, and Lawrence M. Litz and Herbert C. Quandt, Lakewood, Ohio, assignors to Union Carbide Corporation, a corporation of New York
No Drawing. Filed June 1, 1960, Ser. No. 33,090
9 Claims. (Cl. 117—5.3)

This invention relates to the manufacture of cerium monosulfide articles, and it more particularly relates to dip casting cerium monosulfide from a suspension thereof onto a metal core.

Power for a great many applications is being supplied today by turbines. In the operation of these machines, a stream of fluid is forced against blades of certain shape and dimension. The pressure of the fluid against the blades causes them to turn the shaft to which they are joined thus producing usable power. These blades must be made of highly refractory, strong material and must be able to withstand high temperatures. Generally, today, nickel, chromium and strong, high-melting alloys are used to make the blades. When turbines are to be used to power aircraft, there is a weight problem to the extent that all aircraft parts must be made as light as possible. In addition to this, it is desirable to be able to cool the blades of a turbine while they are in operation.

In order to fulfill both of these desirable requirements, it would be best to have turbine blades which have one or more channels in the body thereof. The purpose of these channels is to remove some of the blade metal and also to provide a path through which a cooling fluid may be passed. It has been determined that the most efficient way of providing these channels is by molding them into the blade when it is initially formed. In order to do this, it is necessary to insert a material into the mold, before the metal is introduced thereto, around which the metal can be molded, so as to take the shape of the mold and the material inserted therein. This material must be refractory enough not to melt at the molding temperature of the metal; it must be dimensionally stable at this temperature; it must be relatively strong; it must not wet or react with the metal; and it must be readily removable from the molded blade after such has been completely formed.

It has been found that cerium monosulfide makes an excellent material for this use as well as for analagous uses in the hollow foundry casting art. Cerium monosulfide has a unique combination of physical and chemical properties which render it an exceedingly good refractory material with good heat resistance and dimensional stability at temperatures up to and higher than those used when molding turbine blades. One of the most important attributes of this material is the fact that it is readily soluble in many dilute acids which fact makes it relatively simple to remove this material from a turbine blade after such has been fabricated.

It is therefore the principal object of this invention to prepare an article comprising cerium monosulfide which is adapted to use as a core material in making hollow castings.

It is another object of this invention to provide a novel composition of matter from which articles of cerium monosulfide may be conveniently made.

It is a further object of this invention to provide a process for preparing refractory cerium monosulfide articles having compatible but dissimilar core materials.

In accordance with and fulfilling the above-noted objetcs, this invention resides in a process for preparing articles made primarily of cerium monosulfide and a core of a dissimilar material which comprises forming a slurry of fine particle size cerium monosulfide in a mixture of a cement and a solvent for said cement, which is relatively volatile and does not react with cerium monosulfide; dipping the core material into and out of this slurry until a sufficient thickness of cerium monosulfide adheres thereto; drying the cerium monosulfide coating; and then sintering the dried object.

This invention further resides in the composition of the suspension from which the cerium monosulfide is deposited. Cerium monosulfide will not of its own accord become suspended in most solvents. Because of this, it has become necessary to find some artificial means of keeping the material from precipitating. Mechanical agitation would seem to be the easiest way to accomplish this; however, the agitation causes eddy currents and vacuum pockets in the solvent bath which tend to remove material from the core after it has deposited thereon. Also because of the confining nature of the container, cross- and counter-currents are set up by mechanical agitation thus resulting in non-uniform deposition of the cerium monosulfide on the core.

It has been found best to use a chemical suspending agent or binder which prevents the particles of cerium monosulfide from precipitating to the bottom of the container. The solvent for the binder is volatile below the sintering temperature of the cerium monosulfide. Of the many materials tried, silicone and epoxy resins, paraffin wax, and latex based cements were found to give the best results. Solvents which were found to give the best results are benzene, toluene, acetone and dry-cleaning naphtha which functioned best in combination with the above-noted suspending and binding agents. Drycleaning naphtha adapted to use in this invention may be characterized by the fact that it is 95 percent aliphatic with a boiling point range of 220° F. to 320° F., a flash point of 45° F. and an ignition point of 450° F. An example of one epoxy resin formulation which is suited to the use herein described is the polymerization product of diglycidyl ether of bis-phenol-A which has been accelerated with triethylamine and wherein the polymer has been diluted with a combination of its dimer and trimer to give a solution having a viscosity of about 500 centipoises. The best epoxy resin formulations were prepared by using resin to accelerator ratios between 1 to 1 and 9 to 1. The silicone resins referred to above are exemplified by the cohydrolyzate of phenyltrichlorosilane, methyltrichlorosilane and dimethyldichlorosilane.

The best combination of solvent and binder that was found, and the one that is preferred in the practice of this invention, is dry-cleaning naphtha and rubber cement. It was found that these materials should be present in a weight proportion of 1 to 3 parts cement and 6 to 10 parts naphtha with 27 to 41 parts cerium monosulfide. These proportions have been found to be critical for these materials since an increase of the cement proportion was discovered to make the suspension too fluid for a good coating to be deposited therefrom onto the core. Similarly, it was found that if the proportion of cerium monosulfide was increased over the upper limit shown above, the suspension became too dry and almost solid. This caused whatever material that was deposited on the core to be dragged off as the core was being withdrawn from the suspension.

Other suspensions comprise 0.5 to 2 parts by weight paraffin wax, 6 to 10 parts by weight benzene and 78 to 89 parts by weight of the fine particle size cerium monosulfide.

The best formulation when using an epoxy resin binder, toluene solvent and cerium monosulfide has been found to be 5 to 7 parts by weight of an epoxy resin as characterized above, 7 to 10 parts by weight of toluene, and 84 to 88 parts by weight of cerium monosulfide. As in the dry-cleaning naphtha-rubber cement-cerium monosulfide slurry referred to above, these proportions have been found to work best for dip coating cerium monosulfide from slurries made up of these materials. It has been found that benzene or acetone may be used interchangeably with toluene in the same concentration range in the above slurry formulation without detracting from the operability of the slurry thus formed.

The proper formulation for a silicone resin binder, toluene solvent, and cerium monosulfide slurry has been found to be 5 to 13 parts by weight of silicone, 6 to 9 parts by weight of solvent, and 78 to 89 parts by weight of cerium monosulfide. Similarly, ½ to 1 part by weight of paraffin wax with 4 to 5 parts by weight of naphtha solvent and 94 to 95 parts by weight of cerium monosulfide give good slurries from which cerium monosulfide may be dip coated.

A great many materials which are adapted to use as cores for cerium monosulfide will suggest themselves to those skilled in the art which this invention is intended to benefit. The core material should be compatible with cerium monosulfide, it should have thermal coefficients which are close to those of cerium monosulfide, and there should be sufficient cohesion between cerium monosulfide and the core material chosen so that a relatively fixed form of article may be made and then stabilized by sintering. Another important consideration which should not be overlooked is that the core material should not melt or soften below the sintering temperature of the cerium monosulfide. Of course, cerium monosulfide itself meets these requirements and it is possible to use a rod or other shapes of this material and coat additional layers thereon from a suspension as described above. This invention, however, is particularly pointed toward the use of relatively thin metal wires either straight or deformed into some useful shape. Of the metals, tungsten and molybdenum are preferred, with molybdenum being more desirable of the two since cerium monosulfide adheres to moylbdenum better than it does to tungsten. Molybdenum also has thermal coefficients which are closer to those of cerium monosulfide than has tungsten. Tungsten, however, is a more rigid material and it finds its most advantageous use where a relatively stiff, straight shape is desired. Moylbdenum, being more flexible, is generally used where bent or more intricate shapes are desired.

Cerium monosulfide articles containing a core are preferably made according to this invention by preparing a suspension of the proportions of materials described above. A core material, preferably a molybdenum or tungsten wire as described above, is dipped into suspension for a short time, then removed and the coating of cerium monosulfide which is adhered to the core dried in air for between 30 and 60 seconds. This process is repeated as many times as necessary to obtain a coating on the core material of the desired thickness. If many coatings are required, or a large surface area is to be coated, it is expedient to add small make-up quantities of cerium monosulfide to the suspension as required to keep the concentration within the limits above specified. If the air drying referred to above is not sufficient to remove enough liquid from the coating to make it dimensionally stable, infrared heating may be used for several minutes either after each coating or after the total desired thickness is obtained. Once the proper thickness of cerium monosulfide adhered to the core material is applied and suitably dried, the article thus formed is sintered under a vacuum at 1600° C. to 2100° C. This forms a finished article which is refractory in character, dimensionally stable, and available for whatever use the article is to be put to.

While the particle size of the cerium monosulfide used in the suspension is by no means critical, it is preferred to use this material in the finely divided state. A powder having all particles of a size sufficient to pass through a 325 mesh, Tyler standard screen has been found to be admirably suited to the practice of this invention.

The following may be cited as specific examples of the practice of this invention:

*Example I*

A suspension was made of 140 grams of cerium monosulfide in 6 grams of rubber cement and 27 grams of dry-cleaning naphtha. A 10 mil diameter tungsten wire was dipped into the suspension for 1 second, withdrawn and air dried for 5 seconds. The dried product was then heated by an infrared source for 10 minutes. This process of dipping, drying and heating was repeated 3 times to give a 0.025 inch thick coating of cerium monosulfide on the tungsten wire. The article was then sintered for 60 minutes at 1800° C. at a pressure of $10^{-4}$ mm. Hg.

*Example II*

A suspension was made of 230 grams of cerium monosulfide in 15 grams of polymerized diglycidyl ether of bis-phenol A dissolved in a mixture of its own dimer and trimer, and 25 milliliters of toluene. A 50 mil diameter molybdenum wire was dipped into the suspension of 2 seconds, withdrawn and air dried for 10 seconds. The dried product was then heated by an infra-red source for 10 minutes. This process of dipping, drying, and heating was repeated 3 times to give a 0.030 inch thick coating of cerium monosulfide on the molybdenum wire. The article was then sintered for 60 minutes at 1800° C. at a pressure of $10^{-4}$ mm. Hg.

*Example III*

A suspension was made of 34 grams of cerium monosulfide in 7 grams of cohydrolyzed phenyltrichlorosilane-methyltrichlorosilane-dimethyl dichlorosilane, and 3 grams of toluene solvent. A 50 mil diameter molybdenum wire was dipped into the suspension for 2 seconds, withdrawn and air dried for 30 seconds. The dried product was then heated by an infra-red source for 10 minutes. This process of dipping, drying, and heating was repeated 3 times to give a .025 inch thick coating of cerium monosulfide on the molybdenum wire. The article was then sintered for 60 minutes at 1800° C. at a pressure of $10^{-4}$ mm. Hg.

*Example IV*

A suspension was made of 43.5 grams of cerium monosulfide in 1 gram of paraffin wax having a melting range of 133° F. to 135° F. and 9 grams of naphtha solvent. A 50 mil diameter tungsten wire was dipped into the suspension for 2 seconds, withdrawn and air dried for 10 seconds. The dried product was then heated by an infra-red source for 10 minutes. The process of dipping, drying, and heating was repeated 1 time to give a 0.005 inch thick coating of cerium monosulfide on the tungsten wire. The article was then sintered for 60 minutes at 1800° C. at a pressure of $10^{-4}$ mm. Hg.

*Example V*

A suspension was made of 89 grams of cerium monosulfide in 5 grams of cohydrolyzed phenyl trichlorosilane-methyl trichlorosilane-dimethyl dichlorosilane, and 9 grams of toluene solvent. A 50 mil diameter tungsten wire was dipped into the suspension for 2 seconds, withdrawn and air dried for 10 seconds. The dried product was then heated by an infra-red source for 10 minutes. This process of dipping, drying, and heating was repeated 2 times to give a 0.0015 inch thick coating of cerium monosulfide on the tungsten wire. The article was then sintered for 60 minutes at 1800° C. at a pressure of $10^{-4}$ mm. Hg.

These fully fabricated articles were each in condition to be used advantageously. In this particular case, each was used as part of the core material for alloy turbine blades. The alloy was cast around the articles and after proper solidification the cerium monosulfide was dissolved by dilute sulfuric acid and the metal core removed. Hollow turbine blades having predetermined core cavities were thereby produced.

What is claimed is:

1. A suspension adapted to provide a vehicle from which cerium monosulfide may be extracted to form a refractory article consisting essentially of a binder selected from the group consisting of 1 to 3 parts by weight rubber cement, 5 to 7 parts by weight epoxy resin, 5 to 13 parts by weight silicone resin, and 0.5 to 2 parts by weight paraffin wax; a solvent for said binder selected from the group consisting of 4 to 10 parts by weight naphtha, 6 to 10 parts by weight toluene, 7 to 10 parts by weight acetone, and 6 to 10 parts by weight benzene; and 27 to 95 parts by weight fine particle size cerium monosulfide.

2. A suspension adapted to provide a vehicle from which cerium monosulfide can be extracted to form a refractory article, which suspension comprises 1 to 3 parts of rubber cement, 6 to 10 parts naphtha and 27 to 41 parts fine particle size cerium monosulfide.

3. A suspension adapted to provide a vehicle from which cerium monosulfide may be extracted to form a refractory article which comprises 5 to 7 parts by weight epoxy resin, 7 to 10 parts by weight a solvent selected from the group consisting of benzene, acetone, and toluene, and 84 to 88 parts by weight cerium monosulfide.

4. A suspension adapted to provide a vehicle from which cerium monosulfide may be extracted to form a ceramic article which comprises 5 to 13 parts by weight silicone resin, 6 to 9 parts by weight toluene and, 78 to 89 parts by weight cerium monosulfide.

5. A suspension adapted to provide a vehicle from which cerium monosulfide may be extracted to form a refractory article which comprises 0.5 to 2 parts by weight paraffin wax, 6 to 10 parts by weight benzene and 78 to 89 parts by weight cerium monosulfide.

6. A suspension adapted to provide a vehicle from which cerium monosulfide can be extracted to form a refractory article, which suspension comprises 0.5 to 1 part by weight paraffin wax, 4 to 5 parts by weight naphtha, and 94 to 95 parts by weight fine particle size cerium monosulfide.

7. A method for forming a refractory article comprising cerium monosulfide which comprises forming a suspension of fine particle size cerium monosulfide in a suspending agent for said cerium monosulfide of a binder for the cerium monosulfide of the group consisting of rubber cement, epoxy resin, silicone resin and paraffin wax and a solvent for said binder, said solvent being volatile below the sintering temperature of said cerium monosulfide; dipping a core of material which does not soften below the sintering temperature of cerium monosulfide and, upon which cerium monosulfide will adhere into said suspension; removing said core, having cerium monosulfide coated thereon, from said suspension; drying said coated core; and sintering the thus produced article at 1600° C. to 2100° C.

8. A method for forming a refractory article comprising cerium monosulfide which comprises forming a suspension of fine particle size cerium monosulfide in a suspending agent for said cerium monosulfide of a binder for the cerium monosulfide of the group consisting of rubber cement, epoxy resin, silicone resin and paraffin wax and a solvent for said binder, said solvent being volatile below the sintering temperature of said cerium monosulfide; dipping a core of material which does not soften below the sintering temperature of the cerium monosulfide, selected from the group consisting of tungsten and molybdenum, into said suspension; removing said core, having cerium monosulfide coated thereon, from said suspension; drying said coated core; and sintering the thus produced article at 1600° C. to 2100° C.

9. A refractory article comprising cerium monosulfide coated onto a relatively thin wire selected from the group consisting of molybdenum and tungsten.

References Cited in the file of this patent

UNITED STATES PATENTS 2,679,669   Kempe _____ June 1, 1954

OTHER REFERENCES

Brewer et al.: Abstract of application Serial No. 791,466, filed December 12, 1947. Published December 26, 1950, in 641 O.G. 1346.